（12） United States Patent
Anderson

(10) Patent No.: US 6,196,947 B1
(45) Date of Patent: Mar. 6, 2001

(54) STROLLER HAVING AN UPPER BODY EXERCISE PROPULSION MECHANISM

(76) Inventor: Douglas Anderson, 227 Dell Pl., Stanhope, NJ (US) 07874

( * ) Notice: Subject to any disclaimer, the term of this patent is extended or adjusted under 35 U.S.C. 154(b) by 0 days.

(21) Appl. No.: 09/329,273

(22) Filed: Jun. 28, 1999

Related U.S. Application Data

(60) Provisional application No. 60/096,761, filed on Aug. 17, 1998.

(51) Int. Cl.[7] .................................................. A63D 21/055
(52) U.S. Cl. ......................... 482/51; 482/129; 280/47.38
(58) Field of Search ................................ 482/51, 62, 68, 482/74, 112, 127–129, 904; 280/304.1, 47.371, 47.36, 47.38

(56) References Cited

U.S. PATENT DOCUMENTS

| 4,334,677 | * | 6/1982 | Tata . | |
| 5,674,165 | | 10/1997 | Cohen et al. | 482/127 |
| 5,876,309 | | 3/1999 | Archey | 482/66 |

* cited by examiner

*Primary Examiner*—John Mulcahy
(74) *Attorney, Agent, or Firm*—Abraham P. Ronai

(57) ABSTRACT

A jogging exercise stroller having a pair of pivotally connected arms. A user encounters greater resistance pivoting the arms in the direction of motion of the stroller than pivoting the arms in the opposite direction.

17 Claims, 5 Drawing Sheets

STROLLER HAVING AN UPPER BODY EXERCISE PROPULSION MECHANISM

This application claims benefit to U.S. provisional application Ser. No. 60/096,761, filed Aug. 17, 1998.

BACKGROUND OF THE INVENTION

1. Field of the Invention

The invention relates to a stroller. More particularly, the invention relates to an exercise device for use with a baby stroller.

2. Description of the Prior Art

Physical fitness has increasingly become an area of concern for parents with newborn babies. This is particularly true for women that traditionally have difficulty regaining their prepregnancy weight. However, many people do not have the time to exercise. As a result, walking a baby in a stroller has become a convenient way, particularly for new mothers, to stay fit and healthy, and to spend time with their child while doing so.

Joining a gym would on the surface seem the obvious choice for parents with toddlers. However, gyms are costly and few offer quality childcare. Besides for the high price of gym membership, parents generally experience tremendous guilt and separation anxiety when leaving their child in someone else's care. This situation is even further compounded for men and women juggling careers with the arduous duties of parenthood.

To that end, cross-country skiing machines that once exclusively adorned gyms can now be found in homes from coast to coast. Cross-country skiing machines have quickly become the home exercise device of choice for parents with children because they provide a user with a full aerobic workout. However, there is a distinct disadvantage to cross-country skiing devices in that they confine the user to one area, usually indoors. Moreover, parents are again left with the daunting task of watching their children while attempting to exercise.

U.S. Pat. No. 5,674,165, issued to Cohen et al., discloses an exercising device provided for use with a baby stroller of the type having a housing secured to the frame of a stroller, and an elongated arm pivotally attached at one end to the housing. The apparatus further includes a device for preventing pivotal movement of the arm relative to the housing until a torsional force greater than a predetermined level is applied to the other end of the arm.

U.S. Pat. No. 5,876,309, issued to Archey, discloses a similar jogging exercise stroller having a pair of arcuate handles pivotally connected on one end to an upper cross member of the stroller. A pair of shock absorbers extend between the arcuate handles and the lower cross member of the stroller.

Both Cohen and Archey recognize the need for a stroller capable of providing the user with an upper body workout. However, a user attempting to exercise with either Cohen's or Archey's device quickly learns that they are not practically designed. The back and forth motion of the arms interrupt the fluid forward movement of the stroller. The Cohen and Archey devices are not as suitable for the purposes of the present invention as disclosed hereafter.

SUMMARY OF THE INVENTION

Accordingly, it is an object of the invention to produce a stroller capable of providing upper body exercise while not interrupting the fluid forward movement of the stroller.

It is another object of the invention produce a stroller having an upper body exercise mechanism connected to it capable of propelling the stroller forward.

The invention is a jogging exercise stroller having a pair of pivotally connected arms. A user encounters greater resistance pivoting said arms in the direction of motion of the stroller than pivoting said arms in the opposite direction.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
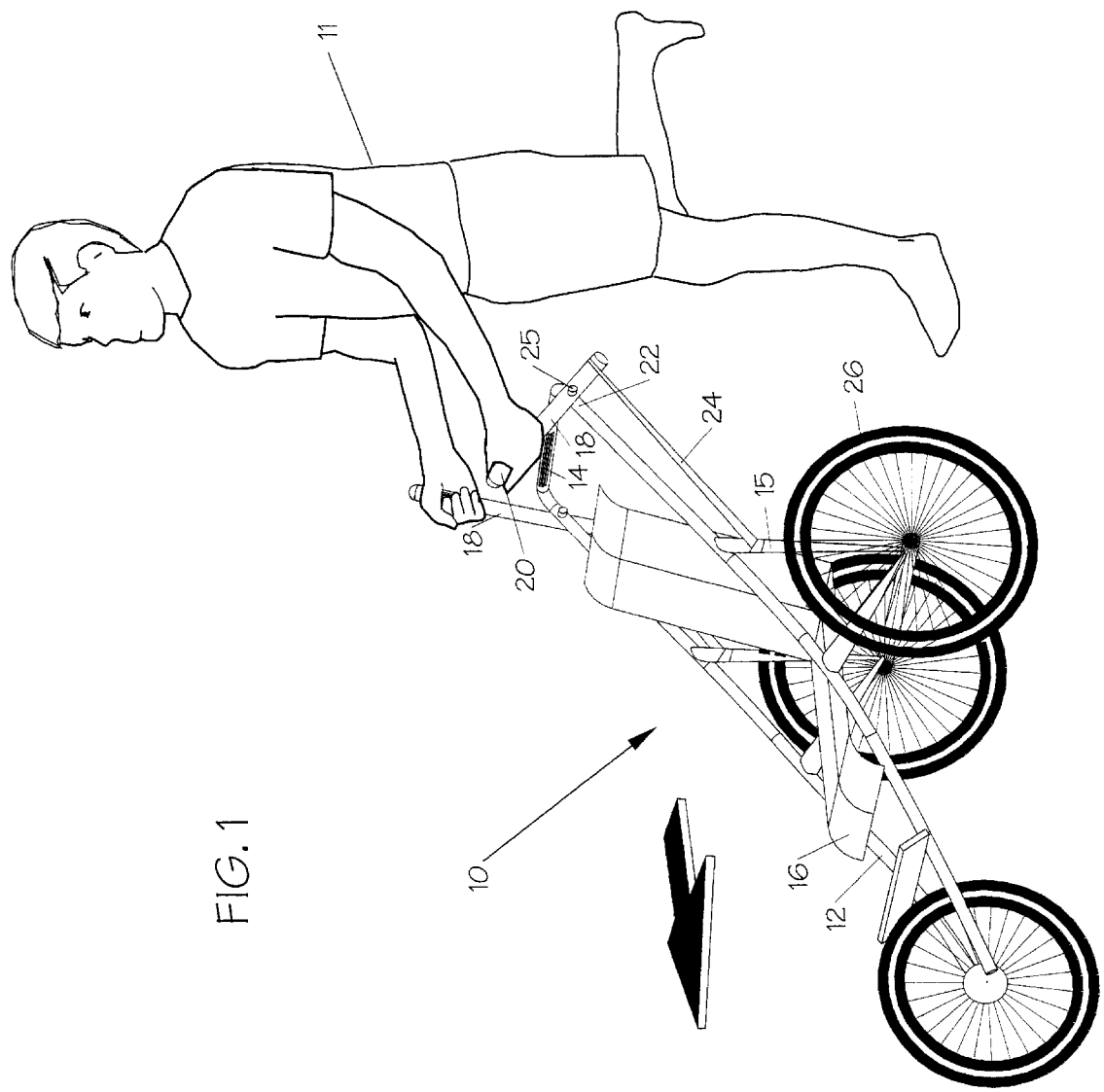
FIG. 1 is a perspective view of the stroller of the present invention.

FIG. 1 illustrates a perspective view of the preferred embodiment of the stroller of the present invention, generally designated 10, being operated by a person (not shown). The stroller 10 comprises a frame 12, having a handle section 14 and a support section 15, a seat 16 attached to the frame 12, a pair of resistance elements 24, wheels 26 connected to the frame 12, and a pair of exercise arms 18 each having a top end 20, a bottom end 22, and a pivot point 25. Each exercise arm 18 is pivotally connected to one side of the handle section 14 at pivot point 25 and is connected at its bottom end 22 to one end of the resistance element 24. The opposite end of each resistance element 24 is connected to one side of the support section 15 of the frame 12. A stopper (not shown) prevents the exercising arms 18 from pivoting beyond the position of the handle section 14 of the frame 12. Exercise arms 18 may be folded down, so as to lie parallel to the frame 12, when ordinary use of the stroller 10 is desired. A brake (not shown) or other accessory, such a speedometer, may be connected to the frame 12. Note that many other embodiments of stroller frames are known in the art and are herein incorporated by reference. Use of the exercise arms 18 and resistance elements 24 with said other stroller frames is anticipated.

Figure 2:
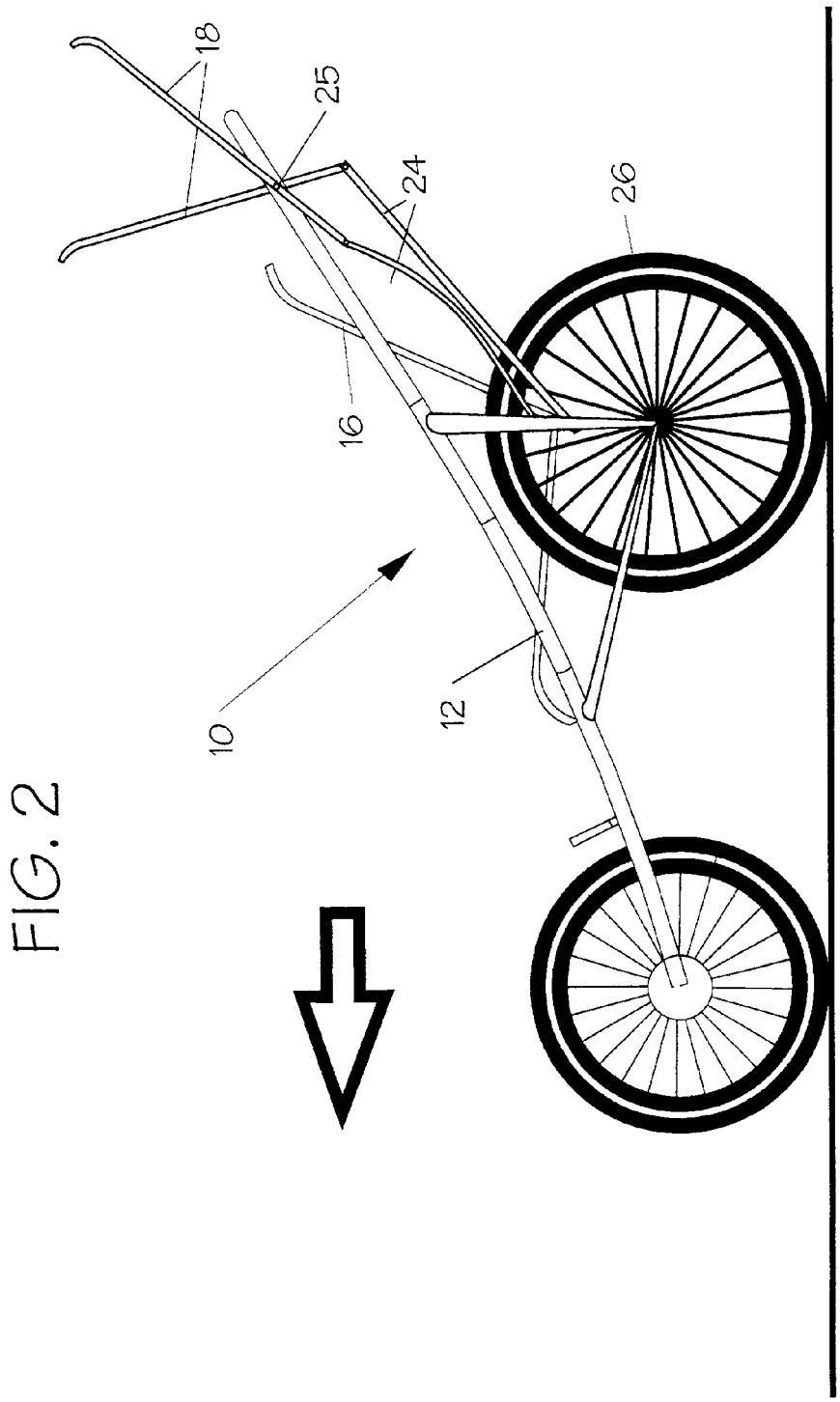
FIG. 2 is a side view of the stroller as shown in FIG. 1.
Figure 3:
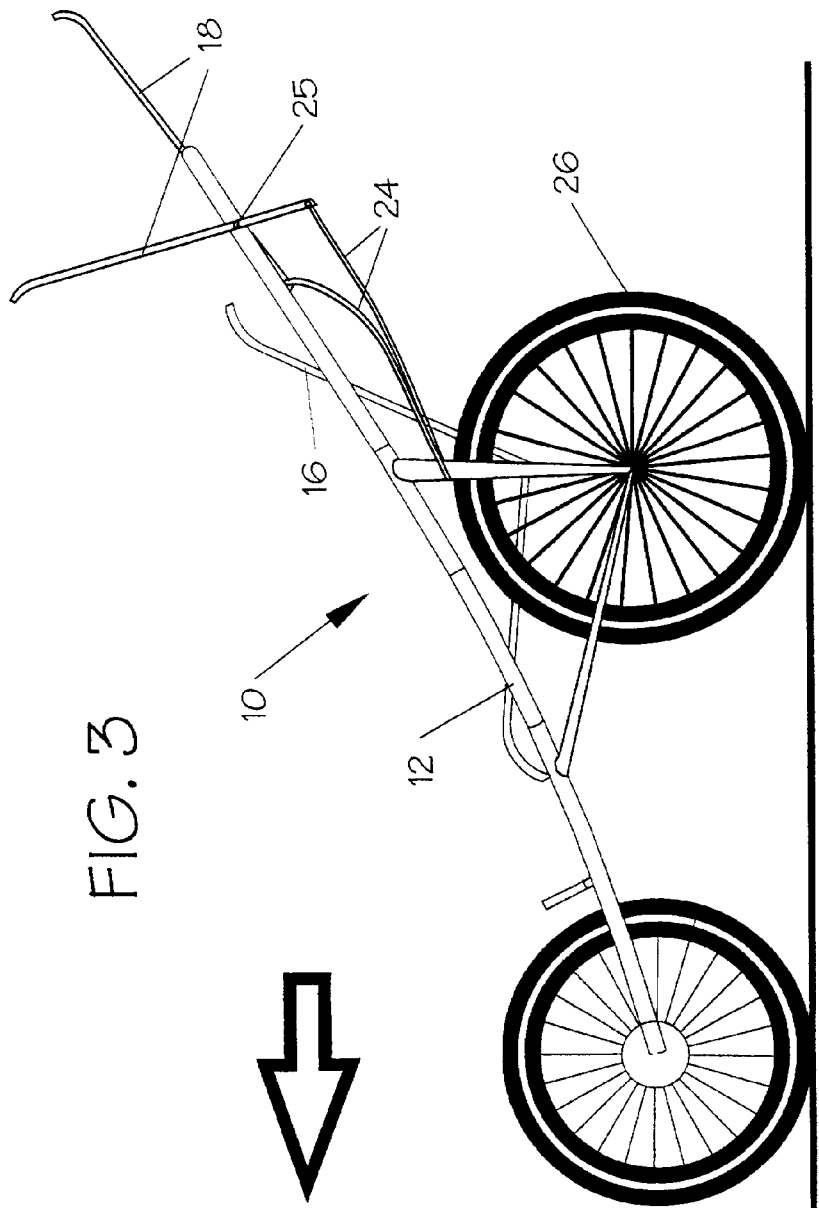
FIG. 3 is a side view of the stroller as shown in FIG. 1 after the arms have swapped positions.

The person using the stroller 10 can obtain an upper body workout by pivoting the exercise arms 18 in opposite directions in a cross-country skiing motion. The energy applied to the arms has the effect of propelling the stroller 10 forward. Thus, the stroller 10 eliminates the separate effort required to get the stroller 10 started and moving and allows a user to concentrate on his or her arm movements. FIGS. 2 and 3 illustrate side views of the stroller 10. FIG. 2 illustrates the stroller 10 at the end of a right handed power stroke. FIG. 3 illustrates the stroller 10 at the end of a left handed power stroke. The force applied to the top end 20 of the exercise arm 18 by the person pivots the exercise arm 18 about pivot point 25 in the direction of motion of the stroller 10 (as indicated by the arrow) and stretches the resistance element 24. A portion of the energy exerted by the person is used to stretch the resistance element 24, the rest of the energy is transferred to the frame 12 via the pivot point 25 and propels the stroller 10 forward. The more resistance to stretch the resistance element 24 is, the greater the portion of energy contributing to the forward movement/propulsion of the stroller 10 will be.

The resistance element 24 is preferably an elastic length of rubber, plastic, or bungee. Thus, pivoting the exercise arm 18 in the direction opposite to the direction of motion of the stroller 10 does not encounter resistance. In fact, a restoring force in the rubber or plastic actually assists in pivoting the exercise arm 18 in the direction opposite to the direction of motion of the stroller 10. This is so because the elastic length of rubber provides resistance in only one direction and because a restoring force is created within the rubber cord upon stretching of said cord. This feature of the resistance element 24, i.e. greater resistance in one direction than the other, assures a fluid movement of the stroller 20. If, as in the prior art, the resistance element 24 provided an equal or greater resistance to movement of the exercise arm 18 in the direction opposite the direction of movement of the stroller 10, movement of the exercise arms 18 would not propel the stroller 10 forward and would make walking the stroller and obtaining an upper body workout an awkward, if not frustrating, experience.

Another example of an appropriate resistance element 24 is a tension spring which provides resistance only when stretched. Other examples of appropriate resistance elements 24 include a piston or a bellows arrangement or a tension/compression spring in which pivoting the exercise arm 18, against a first force in the direction of motion of the stroller, would stretch or expand the piston or bellows arrangement or the tension/compression spring and pivoting of the exercise in the opposite direction, against a second force, would restore the original size or length of the piston or bellows arrangement or the tension/compression spring. It is preferred that the first force be larger than the second force so as to assure a fluid forward movement of the stroller 10.

The resistance element 24 may also comprise two parallel or telescoping members which engage one another by a ratchet mechanism. Said ratchet mechanism may be designed to retard relative axial motion of said members in either direction. Alternatively, the resistance element may comprise a damper type element, similar to those used to control the closing of a screen door, wherein the damper is made to resist compression more so than extension. Yet another embodiment of the resistance element may comprise two telescoping members whose relative movement is controlled by a magnetic or electromagnetic member. Said member allowing for telescoping of the members against the first force and withdrawal or retraction of the members against the second force. Still yet another embodiment of the resistance element 24 may comprise a shock absorber type element which requires a different level of force to compress and to lengthen.

The resistance element 24 may also comprise a drum, similar to a retractable clothes line drum, connected to the frame having a cord wrapped around it. One end of the cord is connected to the bottom end 22 of the exercise arm. Pivoting of the exercise in the direction of movement of the stroller 10 pulls the cord off the drum and rotates the drum against a resistance. The resistance may be created by a spring wrapped inside or about the drum or other methods known in the art. Upon release of the exercise arm 18 the drum retracts the cord.

It is also anticipated to vary the attachment point of the resistance element 24 to the frame 12 such that it is compression of said resistance element 24, specifically the spring, bellows, piston, or telescoping or parallel rod arrangements, that propels the stroller 10 forward as opposed to stretching or expansion of said resistive element 24.

Figure 4:
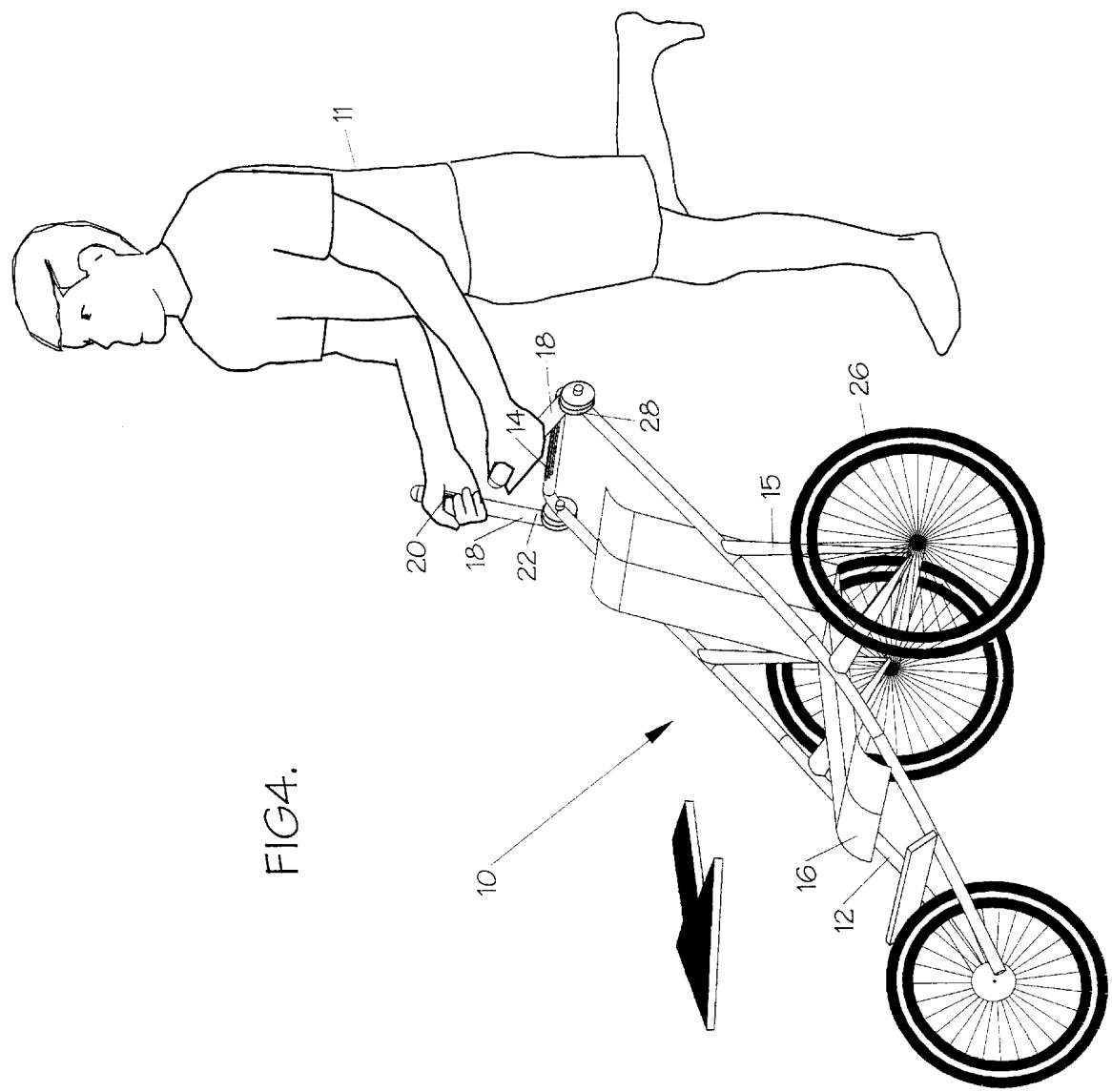
FIG. 4 is perspective view of an alternative embodiment of the stroller having a resistive coil.

FIG. 4 illustrates a perspective view of an alternate embodiment of the invention. In this embodiment the bottom end 22 of each exercise arm 18, or an area closer to the bottom end 22 than the top end 20, is connected to a resistance element 24 which is connected to the frame 12. The resistance element, as illustrated in FIG. 4 is a coil 28. Similar to the above described embodiments movement of the exercise arm 18 in the direction of motion encounters a greater force than movement of the exercise arm 18 in the opposite direction, thus providing for a fluid motion of the stroller 10. The coil 28 may be replaced with a circular ratchet mechanism which provides a greater resistance to rotation in one direction. Alternatively, a bolt may secure the exercise arm to the frame 12 and a friction surface (not shown) bolted between the frame 12 and the exercise arm 18 may control the amount of friction the exercise arm 18 encounters in different portions of its pivot arc. For example, a washer bolted between the exercise arm 18 and the frame may have a rough portion and a smoother portion. The washer is fixed so it does not rotate relative to the frame 12. As the exercise arm 18 pivots in the direction of motion of the stroller 10 it encounters the high friction surface of the washer providing resistance to movement of said exercise arm 18. As the exercise arm 18 is pivoted back it encounters the smoother surface.

Figure 5:
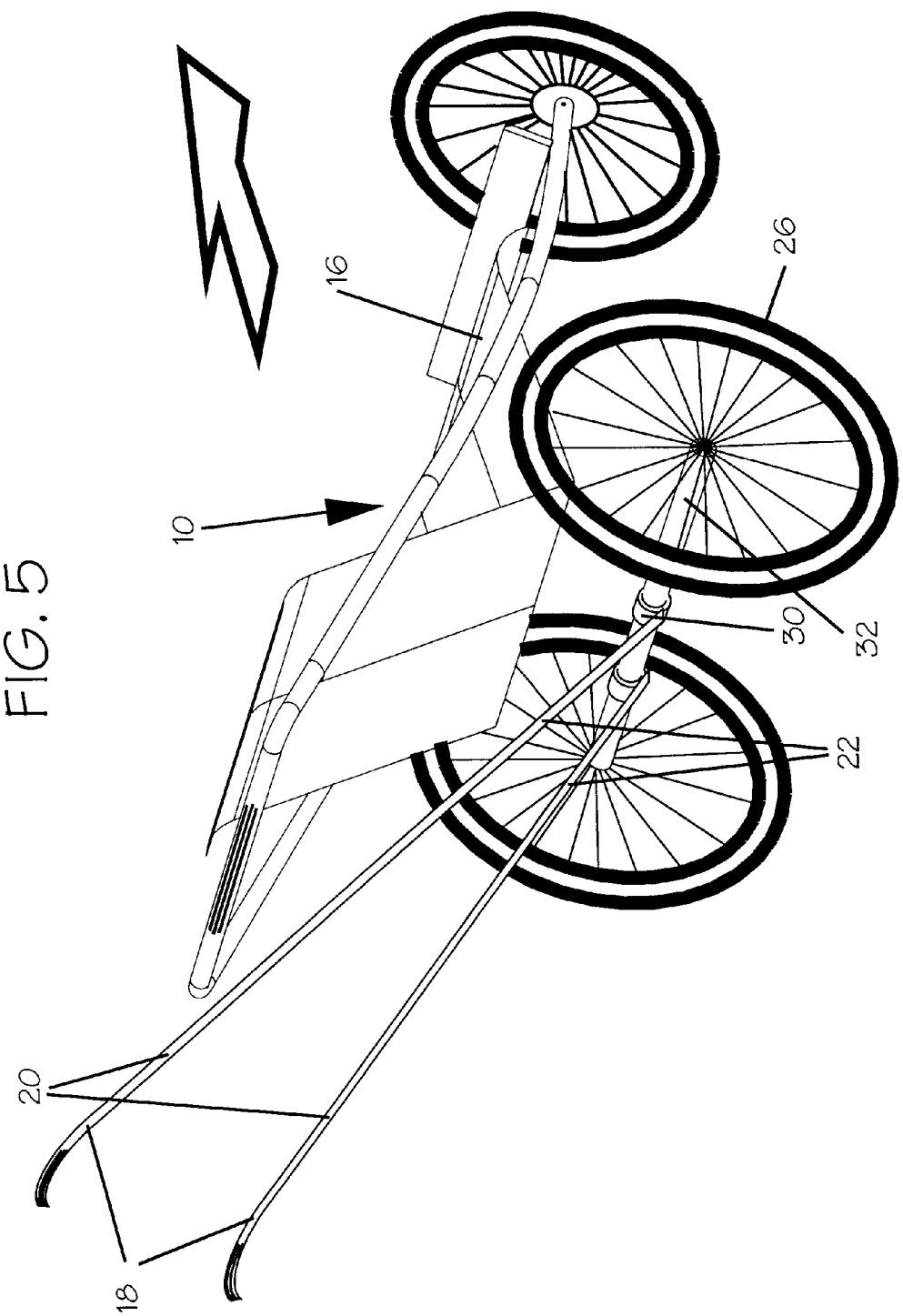
FIG. 5 is a perspective view of another alternative embodiment of the stroller wherein the exercise arms engage the drive shaft of the stroller.

FIG. 5 illustrates a rear perspective view of another embodiment of the present invention. A drive shaft 32 is connected to the frame and to one wheel 26 on each of its ends. The bottom end 22 of the exercise arms 18 engage the drive shaft by means of one-way ball bearings 30 disposed about and connected to the drive shaft 32. Alternatively, exercise arms 18 may connected directly to each wheel 26. Pivoting the exercise arms 18 propels the stroller 10 forward by rotating the drive shaft, similar to a bicycle. Alternatively, the one way ball bearings 30 may be replaced with a circular one-way ratchet mechanisms or similar devices. Rather than engaging the drive shaft 32 directly, a gear mechanism may be connected between the bottom end 22 of the exercise arms 18 and the drive shaft 32 or wheels 26. A gear mechanism would allow a user to propel the stroller 10 faster while still maintaining exercise arm 18 pivot resistance.

In alternate embodiments of the invention, arms 18 may be pivotally connected to various other locations on the frame 12 allowing for other types of upper body exercise motions, such as but not limited to exercise of the chest or back muscles. In all of these embodiments, however, it is preferred that movement of the exercise arms 18 in a direction creating a forward momentum in the stroller 10 encounter more resistance than movement of the exercise arms 18 in the opposite direction.

The present invention is not limited to a stroller, i.e a frame resting on wheels. The frame may rest on alternate locomotion devices such as skis or be connected to a device capable of magnetically levitating the frame. Furthermore, the frame may be of any shape or size and may accommodate any type of load. For example, the exercise arms 18 may be pivotally connected to a frame having the shape of a shopping cart so that customers could exercise while they shop.

What is claimed is:

1. A carriage device comprising a frame, a locomotion means connected to said frame, and a propulsion means for use by a person at a rearward end of said frame for pushing said stroller in a forward direction, said propulsion means including one or more arms pivotally connected to said frame for movement in the forward and rearward directions and one or more resistance means for resisting movement of said one or more arms, said resistance means providing greater resistance against movement of said one or more arms in the forward direction than against movement of said one or more arms in the rearward direction.

2. The stroller as claimed in claim 1 wherein the locomotion means comprises wheels connected to the frame; and wherein the propulsion means comprises one or more arms connected to a drive mechanism, said drive mechanism engages the wheels, movement of said arms relative to the stroller causes the wheels to rotate.

3. The carriage device as claimed in claim 1 wherein the carriage device is a stroller and wherein the locomotion means comprises on or more wheels connected to the frame.

4. The stroller as claimed in claim 3 wherein the resistance means is an elastic cord.

5. The stroller as claimed in claim 3 wherein the resistance means comprises a spring.

6. The stroller as claimed in claim 3 wherein the resistance means comprises a piston.

7. The stroller as claimed in claim 3 wherein the resistance means comprises a bellows.

8. A stroller comprising a frame, one or more wheels connected to said frame, one or more arms for use by a person at a rearward and of said frame for pushing said stroller in a forward direction, and one or more resistance means, each resistance means being connected to one arm at a first attachment point, each arm being pivotally connected to the frame between the first attachment point and one end of the arm for movement in the forward and rearward directions, said resistance means providing greater resistance against movement of said arm in the forward direction than against movement of said arm in the rearward direction.

9. The stroller as claimed in claim 8 wherein the resistance means comprises an elastic cord.

10. The stroller as claimed in claim 8 wherein the resistance means comprises a spring.

11. The stroller as claimed in claim 8 wherein the resistance means comprises a piston.

12. The stroller as claimed in claim 8 wherein the resistance means comprises a bellows.

13. The stroller as claimed in claim 8 wherein the first attachment point is at or about one end of each arm and wherein the arm is pivotally connected to the frame between the first attachment point and an opposite end of the arm.

14. A carriage device comprising a frame, at least one wheel connected to a front end of the frame and at least two wheels connected to a rearward end of the frame, two arms pivotally connected to the frame for use by a person at the end of the frame for pushing said carriage device in a forward direction, and one or more elastic cords, each elastic cord being connected to one arm at a first attachment point, each arm being pivotally connected to the frame between the first attachment point, each arm being pivotally connected to the frame between the first attachment point and one end of the arm for movement in the forward and rearward directions, the one or more elastic cords providing greater resistance against movement of the arms in the forward direction than against movement of the arms in the rearward direction.

15. The carriage device as claimed in claim 14 wherein the carriage device is a stroller.

16. A method for obtaining upper body exercise by propelling a carriage device from a rearward end of said carriage device, said carriage device comprising a frame, one or more wheels connected to said frame, a first arm and a second arm, and a pair of resistance means, at least one resistance means being connected between the frame and each arm, each arm being pivotally connected to the frame at a pivot point, the method comprising the steps of:

a) pivoting the first arm in a forward direction against a relatively large resistance to push the carriage device in the forward direction while pivoting the second arm in the opposite direction against a relatively small resistance;

b) pivoting the second arm in the forward direction against a relatively large resistance to push the carriage device in the forward direction while pivoting the first arm in the opposite direction against a relatively small resistance; and c) repeating steps (a) through (b) as desired.

17. The method as claimed in claim 16 wherein the carriage device is a stroller.

* * * * *